United States Patent
Modiano et al.

(10) Patent No.: US 12,311,362 B2
(45) Date of Patent: May 27, 2025

(54) SYSTEM AND METHOD FOR PATTERNING FLOW CELL SUBSTRATES

(71) Applicant: ILLUMINA, INC., San Diego, CA (US)

(72) Inventors: Steven Modiano, San Diego, CA (US); Dajun Yuan, San Diego, CA (US); Randall Smith, San Diego, CA (US)

(73) Assignee: ILLUMINA, INC., San Diego, CA (US)

( * ) Notice: Subject to any disclaimer, the term of this patent is extended or adjusted under 35 U.S.C. 154(b) by 574 days.

(21) Appl. No.: 17/414,612

(22) PCT Filed: Aug. 10, 2020

(86) PCT No.: PCT/IB2020/057507
§ 371 (c)(1),
(2) Date: Jun. 16, 2021

(87) PCT Pub. No.: WO2021/028815
PCT Pub. Date: Feb. 18, 2021

(65) Prior Publication Data
US 2022/0134333 A1 May 5, 2022

Related U.S. Application Data

(60) Provisional application No. 62/884,753, filed on Aug. 9, 2019.

(30) Foreign Application Priority Data

Aug. 21, 2019 (NL) ..................................... 2023679

(51) Int. Cl.
*B01L 3/00* (2006.01)
*C08F 220/56* (2006.01)

(52) U.S. Cl.
CPC ... *B01L 3/502707* (2013.01); *B01L 3/502715* (2013.01); *C08F 220/56* (2013.01);
(Continued)

(58) Field of Classification Search
CPC ......... B01L 3/502707; B01L 3/502715; B01L 3/5027; B01L 2200/12; B01L 2200/16;
(Continued)

(56) References Cited

U.S. PATENT DOCUMENTS

2011/0117637 A1   5/2011   Gray et al.
2011/0306143 A1   12/2011  Chiou et al.
(Continued)

FOREIGN PATENT DOCUMENTS

WO   WO 2019/126040 A1   6/2019

OTHER PUBLICATIONS

Chen, Rodney T., et al. "Photoinitiated alkyne-azide click and radical cross-linking reactions for the patterning of PEG hydrogels." *Biomacromolecules* 13.3 (2012): 889-895.
(Continued)

*Primary Examiner* — Kathryn Elizabeth Limbaugh
(74) *Attorney, Agent, or Firm* — Frost Brown Todd LLP

(57) ABSTRACT

A method for patterning flow cell substrates using photo-initiated chemical reactions that includes fabricating a planar waveguide flow cell by forming a layer of light coupling gratings on a glass substrate layer; depositing a core layer on the layer of light coupling gratings; depositing a cladding layer on the core layer; and forming nanowells in the cladding layer; silanizing the cladding layer; coating the silanized cladding layer and nanowells with a first group of reactants; introducing a second group of reactants into the nanowells, wherein the second group of reactants includes a target reactant and a light-sensitive photoinitiator system; coupling a light source to the light coupling gratings and
(Continued)

directing light internally within the planar waveguide flow cell for photo-initiating a chemical reaction between the first and second groups of reactants, wherein the photo-initiated chemical reaction covalently binds the target reactant to only the bottom portion of each nanowell.

20 Claims, 6 Drawing Sheets

(52) U.S. Cl.
CPC ....... *B01L 2200/12* (2013.01); *B01L 2200/16* (2013.01); *B01L 2300/0829* (2013.01); *B01L 2300/0893* (2013.01); *B01L 2300/0896* (2013.01); *B01L 2300/12* (2013.01)

(58) Field of Classification Search
CPC ..... B01L 2300/0829; B01L 2300/0893; B01L 2300/0896; B01L 2300/12; C08F 220/56; C12Q 1/6869; B01J 19/0046; B01J 19/127; B01J 19/12; B01J 19/121; B01J 2219/00286; B01J 2219/00317; B01J 2219/00432; B01J 2219/00511; B01J 2219/00596; B01J 2219/00608; B01J 2219/00612; B01J 2219/00617; B01J 2219/00621; B01J 2219/00623; B01J 2219/00632; B01J 2219/00637; B01J 2219/00639; B01J 2219/00644; B01J 2219/00711; B01J 2219/00722; B01J 2219/0879
See application file for complete search history.

(56) References Cited

U.S. PATENT DOCUMENTS

| | | |
|---|---|---|
| 2014/0200158 A1 | 7/2014 | Bowen et al. |
| 2015/0005447 A1 | 1/2015 | Berti et al. |
| 2019/0046983 A1 | 2/2019 | Kelso et al. |
| 2020/0206091 A1* | 7/2020 | Nojiri .................. C08K 5/5313 |

OTHER PUBLICATIONS

Poloukhtine, Andrei A., et al. "Selective labeling of living cells by a photo-triggered click reaction." *Journal of the American Chemical Society* 131.43 (2009): 15769-15776.

Shete, Abhishek U., and Christopher J. Kloxin. "One-pot blue-light triggered tough interpenetrating polymeric network (IPN) using CuAAC and methacrylate reactions." *Polymer chemistry* 8.24 (2017): 3668-3673.

Shete, Abhishek U., et al. "Blue-light activated rapid polymerization for defect-free bulk Cu (i)-catalyzed azide-alkyne cycloaddition (CuAAC) crosslinked networks." *Chemical Communications* 52.69 (2016): 10574-10577.

International Search Report and Written Opinion dated Oct. 12, 2020, for International Application No. PCT/IB2020/057507, 11 pages.

Netherlands Search Report and Written Opinion dated Apr. 1, 2020, for Application Serial No. 2023679, 11 pages.

* cited by examiner

SYSTEM AND METHOD FOR PATTERNING FLOW CELL SUBSTRATES

CROSS-REFERENCE TO RELATED APPLICATIONS

This application is a national stage entry of International Patent Application No. PCT/IB2020/057507, entitled "System and Method for Patterning Flow Cell Substrates," filed on Aug. 10, 2020, which claims priority to U.S. Provisional Patent Application No. 62/884,753 filed on Aug. 9, 2019. International Patent Application No. PCT/IB2020/057507 also claims priority to Dutch Patent Application No. 2023679 filed on Aug. 21, 2019 The disclosures of each of the aforementioned applications is incorporated herein by reference in its entirety.

BACKGROUND

Fabrication of nanowell substrates used in industrial processes such as sequencing-by-synthesis may involve a complex process that includes surface functionalization of a microfluidic device such as, for example, a flow cell that houses or otherwise contains the nanowell substrates. In some examples, a particularly difficult aspect of nanowell substrate fabrication involves removing existing surface chemistry found in interstitial areas between nanowells by polishing these interstitial spaces. Problematic issues associated with this type of surface preparation include over polishing, under polishing, and scratching or damaging of patterned surfaces. Accordingly, there is a need for method for fabricating nanowell substrates that does not suffer from the aforementioned complexities and difficulties.

SUMMARY

The following provides a summary of certain examples. This summary is not an extensive overview and is not intended to identify key or critical aspects or elements of the present invention or to delineate its scope.

Implementations of the described system and methods have the benefits of enabling spatially resolved chemical patterning of nanometer scaled features within microfluidic devices such as flow cells and improving nanowell substrate fabrication by eliminating the polishing step completely. Described methods utilize planar waveguides or similar devices to spatially control chemical functionalization of specific, predetermined areas of each nanowell substrate fabricated into a flow cell. Nanowell substrates are patterned into microfluidic flow cell devices using known flow cell fabrication processes. The planar waveguide directs excitation light into only the bottom of each nanowell substrate where it photoinitiates a chemical reaction that covalently binds a target reactant to the bottom region of the nanowell substrate. Unreacted molecules removed during a wash step that follows photoinitiation without any deleterious effect on flow cell patterned surfaces. In some implementations, the disclosed system and methods utilize the same light sources that are used during the sequencing-by-synthesis process and certain blue-light (e.g., 470 nm wavelength) sensitive photoinitiator systems.

In accordance with one implementation, a first method for patterning flow cell substrates is provided. This method comprises preparing a flow cell for a photoinitiated chemical reaction, wherein the flow cell includes a substrate having light coupling gratings formed thereon; a first layer of material disposed over the substrate; a second layer of material disposed over the first layer of material; and nanowells formed in the second layer of material, wherein each nanowell includes a top portion and a bottom portion, and wherein preparing the flow cell includes silanizing the second layer of material; and coating the silanized second layer of material and nanowells with a first group of reactants; introducing a second group of reactants into the nanowells, wherein the second group of reactants includes at least one target reactant, a copper chelated ligand, and a light-sensitive photoinitiator system; and directing light internally within the flow cell through the light coupling gratings to only the bottom portion of each nanowell for photo-initiating a chemical reaction between the first and second groups of reactants, wherein the photo-initiated chemical reaction covalently binds the target reactant to only the bottom portion of each nanowell. In certain examples, the method further comprises washing unreacted reactants out of the nanowells; using a polymer and azide moieties that are bound to the polymer as the first group of reactants; using poly(N-(5-azidoacetamidylpentyl) acrylamide as the polymer; using a camphorquinone-amine photosensitizing system using a light wavelength of about 470 nm as the light-sensitive photoinitiator system; using an alkyne-linked primer as the target reactant; using an alkyne-linked fluorophore as the target reactant; using a laser as a source of light; and using a material having a refractive index in the range of 1.0 to 1.3 for the substrate and a material having a refractive index in the range of 2.0 to 2.15 for the first layer, although other values are possible.

In accordance with another implementation, a second method for patterning flow cell substrates is provided. This method comprises fabricating a planar waveguide flow cell by forming a layer of light coupling gratings on a glass substrate layer; depositing a core layer on the layer of light coupling gratings; depositing a cladding layer on the core layer; and forming nanowell substrates in the cladding layer, wherein each nanowell substrate includes a top portion and a bottom portion, and wherein the nanowell substrates define interstitial regions therebetween; silanizing the cladding layer; coating the silanized cladding layer and nanowell substrates with a first group of reactants; introducing a second group of reactants into the nanowell substrates, wherein the second group of reactants includes at least one target reactant, a copper chelated ligand, and a light-sensitive photoinitiator system; directing light internally within the planar waveguide flow cell through the light coupling gratings to only the bottom portion of each nanowell substrate for photo-initiating a chemical reaction between the first and second groups of reactants, wherein the photo-initiated chemical reaction covalently binds the target reactant to only the bottom portion of each nanowell substrate. In certain examples, the method further comprises washing unreacted reactants out of the nanowells; using a polymer and azide moieties that are bound to the polymer as the first group of reactants; using poly(N-(5-azidoacetamidylpentyl) acrylamide as the polymer; using a camphorquinone-amine photosensitizing system using a light wavelength of about 470 nm as the light-sensitive photoinitiator system; using an alkyne-linked primer as the target reactant; using an alkyne-linked fluorophore as the target reactant; using a laser as a source of light; and using a material having a refractive index in the range of 1.0 to 1.3 for the layer of light coupling gratings and a material having refractive index in the range of 2.0 to 2.15 for the core layer, although other values are possible.

In yet another implementation, a third method for spatially patterning flow cell substrates is provided. This method comprises fabricating a planar waveguide flow cell by forming a layer of light coupling gratings on a glass substrate layer; depositing a core layer on the layer of light coupling gratings; depositing a cladding layer on the core layer; and forming nanowell substrates in the cladding layer, wherein each nanowell substrate includes a top portion and a bottom portion, and wherein the nanowell substrates define interstitial regions therebetween; and silanizing the cladding layer; coating the cladding layer and nanowell substrates with a first group of reactants, wherein the first group of reactants further includes a polymer, azide moieties bound to the polymer, a copper ligand and a light-sensitive photoinitiator system; directing light of a predetermined wavelength internally within the planar waveguide flow cell to only the bottom portion of each nanowell substrate for photo-initiating a chemical reaction between the reactants in the first group of reactants, wherein the photo-initiated chemical reaction covalently binds the polymer to only the bottom portion of each nanowell substrate; introducing a second group of reactants into the nanowell substrates, wherein the second group of reactants includes at least one target reactant, a copper ligand and a light-sensitive photoinitiator system; and directing light of a predetermined wavelength internally within the planar waveguide flow cell to only the bottom portion of each nanowell substrate for photo-initiating a chemical reaction between the covalently bound polymer and the second group of reactants, wherein the photo-initiated chemical reaction covalently binds the target reactant to only the bottom portion of each nanowell substrate. In certain examples, the method further comprises washing unreacted reactants out of the nanowell substrates after each photo-initiated chemical reaction; using 3-azidopropyltrimethoxysilane for silanizing the cladding layer; using poly(N-(5-azidoacetamidylpentyl) acrylamide as the polymer; using a camphorquinone-amine photosensitizing system using a light wavelength of about 470 nm as the light-sensitive photoinitiator system; using an alkyne-linked primer as the target reactant; using an alkyne-linked fluorophore as the target reactant; using a laser as a source of light; and using a material having a refractive index in the range of 1.0 to 1.3 for the layer of light coupling gratings and a material having refractive index in the range of 2.0 to 2.15 for the core layer, although other values are possible.

In another implementation, the methods herein include silanizing carried out by way of vapor deposition of norbornene silane. In one example, poly(N-(5-azidoacetamidylpentyl) acrylamide is spin coated on the silanized layer by way of the following procedure: Step 1—600 rpm, 5 seconds, acceleration 1500 rpm/second; Step 2—1500 rpm, 30 seconds, acceleration 5000 rpm/second; Step 3—4000 rpm, 5 seconds, acceleration 5000 rpm/second; Step 4—600 rpm, 5 seconds, acceleration 5000 rpm/second, and subsequently preferably heating at 65-75° C. for 1 hour. In another example, silanizing is carried out by vapor deposition of 3-azidopropyltrimethoxysilane, whereafter poly(N-(5-azidoacetamidylpentyl) acrylamide is preferably crosslinked to azide groups using a photo-initiated reaction that uses a bi-functional crosslinker such as NH-bis (PEG-2 Propargyl), a photo-initiator, (e.g., camphorquinone at 470 nm), and copper sulfate with a ligand, for example PMDTA. In yet another example, poly(N-(5-azidoacetamidylpentyl) acrylamide is covalently bound to surfaces at the bottom of the nanowells using the light, preferably laser light.

In accordance with another implementation, the methods herein include light directed through the light coupling gratings to only a bottom portion of each nanowell for photo-initiating the chemical reaction between the first and second groups of reactants. In one example, copper is subsequently removed using a dilute solution of EDTA (0.1M). In another example, the method is absent a polishing step to remove any existing surface chemistry found in interstitial areas between the nano wells.

In still another implementation, a flow cell is provided. In one example, the flowcell comprises: a substrate, a light coupling grating layer arranged on the substrate, which light coupling grating layer has a refractive index, a core layer arranged on the light coupling grating layer, which core layer has a refractive index, wherein the refractive index of the core layer is greater than the refractive index of the light coupling grating layer, a silanized layer arranged on the core layer in which silanized layer multiple nanowells are separated by interstitial areas. In one example, the substrate is glass. In another example, the light coupling grating layer and core layer are formed from a resin. In yet another example, the light coupling grating layer and/or the core layer are formed from a tantalum pentoxide. In still another example, the flow cell includes poly(N-(5-azidoacetamidylpentyl) acrylamide covalently bound to surfaces at the bottom of the nanowells. In another example, the flow cell includes the second group of reactants arranged on the first group of reactants, and includes at least one target reactant, a copper chelated ligand, and a light sensitive photoinitiator system. In still another example, the flow cell is a planar waveguide flow cell. This flow cell may be used for nucleic acid sequencing including high-volume sequencing-by-synthesis and may be made in accordance with any method disclosed herein for manufacturing flow cells and spatially patterning flow cell substrates.

It is to be understood that any respective features/examples of each of the aspects of the disclosure as described herein may be implemented together in any combination to achieve the benefits and results as described herein, and that any features/examples from any one or more of these aspects may be implemented together with any of the features of the other aspect(s) as described herein in any combination to achieve the benefits as described here.

The disclosure includes the following clauses:

1. A method for patterning flow cell substrates, comprising:
   preparing a flow cell for a photoinitiated chemical reaction, wherein the flow cell includes a substrate having light coupling gratings formed thereon;
   a first layer of material disposed over the substrate;
   a second layer of material disposed over the first layer of material; and nanowells formed in the second layer of material, wherein each nanowell includes a top portion and a bottom portion, and wherein preparing the flow cell includes:
   silanizing the second layer of material;
   coating the silanized second layer of material and nanowells with a first group of reactants;
   introducing a second group of reactants into the nanowells, wherein the second group of reactants includes at least one target reactant, a copper chelated ligand, and a light-sensitive photoinitiator system; and
   directing light internally within the flow cell through the light coupling gratings to only the bottom portion of each nanowell for photo-initiating a chemical reaction between the first and second groups of reactants,
   wherein the photo-initiated chemical reaction covalently binds the target reactant to only the bottom portion of each nanowell.

2. The method of clause 1, further comprising washing unreacted reactants out of the nanowells.

3. The method of any of clauses 1-2, further comprising using a polymer and azide moieties that are bound to the polymer as the first group of reactants.

4. The method of clause 3, further comprising using poly (N-(5-azidoacetamidylpentyl) acrylamide as the polymer.

5. The method of any of clauses 1-4, further comprising using a camphorquinone-amine photosensitizing system using a light wavelength of 470 nm as the light-sensitive photoinitiator system.

6. The method of any of clauses 1-5, further comprising using an alkyne-linked primer as the target reactant.

7. The method of any of clauses 1-6, further comprising using an alkyne-linked fluorophore as the target reactant.

8. The method of any of clauses 1-7, further comprising using a laser as a source of light.

9. The method of any of clauses 1-8, further comprising using a material having a refractive index in the range of 1.0 to 1.3 for the substrate and a material having a refractive index in the range of 2.0 to 2.15 for the first layer.

10. A method for patterning flow cell substrates, comprising:
   fabricating a planar waveguide flow cell, wherein fabricating the planar waveguide flow cell includes:
   forming a layer of light coupling gratings on a glass substrate layer;
   depositing a core layer on the layer of light coupling gratings;
   depositing a cladding layer on the core layer; and
   forming nanowell substrates in the cladding layer, wherein each nanowell substrate includes a top portion and a bottom portion, and wherein the nanowell substrates define interstitial regions therebetween;
   silanizing the cladding layer;
   coating the silanized cladding layer and nanowell substrates with a first group of reactants;
   introducing a second group of reactants into the nanowell substrates, wherein the second group of reactants includes at least one target reactant, a copper chelated ligand, and a light-sensitive photoinitiator system; and
   directing light internally within the planar waveguide flow cell through the light coupling gratings to only the bottom portion of each nanowell substrate for photo-initiating a chemical reaction between the first and second groups of reactants,
   wherein the photo-initiated chemical reaction covalently binds the target reactant to only the bottom portion of each nanowell substrate.

11. The method of clause 10, further comprising washing unreacted reactants out of the nanowell substrates.

12. The method of any of clauses 10-11, further comprising using a polymer and azide moieties that are bound to the polymer as the first group of reactants.

13. The method of clause 12, further comprising using poly(N-(5-azidoacetamidylpentyl) acrylamide as the polymer.

14. The method of any of clauses 10-13, further comprising using a camphorquinone-amine photosensitizing system using a light wavelength of 470 nm as the light-sensitive photoinitiator system.

15. The method of any of clauses 10-14 further comprising using an alkyne-linked primer as the target reactant.

16. The method of any of clauses 10-15 further comprising using an alkyne-linked fluorophore as the target reactant.

17. The method of any of clauses 10-16, further comprising using a laser as a source of light.

18. The method of any of clauses 10-17 further comprising using a material having a refractive index in the range of 1.0 to 1.3 for the layer of light coupling gratings and a material having a refractive index in the range of 2.0 to 2.15 for the core layer.

19. A method for patterning flow cell substrates, comprising:
   fabricating a planar waveguide flow cell, wherein fabricating the planar waveguide flow cell includes:
   forming a layer of light coupling gratings on a glass substrate layer;
   depositing a core layer on the layer of light coupling gratings;
   depositing a cladding layer on the core layer; and
   forming nanowell substrates in the cladding layer, wherein each nanowell substrate includes a top portion and a bottom portion, and wherein the nanowell substrates define interstitial regions therebetween; and
   silanizing the cladding layer;
   coating the cladding layer and nanowell substrates with a first group of reactants, wherein the first group of reactants further includes a polymer, azide moieties bound to the polymer, a copper ligand, and a light-sensitive photoinitiator system;
   directing light of a predetermined wavelength internally within the planar waveguide flow cell to only the bottom portion of each nanowell substrate for photo-initiating a chemical reaction between the reactants in the first group of reactants, wherein the photo-initiated chemical reaction covalently binds the polymer to only the bottom portion of each nanowell substrate;
   introducing a second group of reactants into the nanowell substrates, wherein the second group of reactants includes at least one target reactant, a copper ligand and a light-sensitive photoinitiator system; and
   directing light of a predetermined wavelength internally within the planar waveguide flow cell to only the bottom portion of each nanowell substrate for photo-initiating a chemical reaction between the covalently bound polymer and the second group of reactants, wherein the photo-initiated chemical reaction covalently binds the target reactant to only the bottom portion of each nanowell substrate.

20. The method of clause 19, further comprising washing unreacted reactants out of the nanowell substrates after each photo-initiated chemical reaction.

21. The method of any of clauses 19-20, further comprising using 3-azidopropyltrimethoxysilane for silanizing the cladding layer.

22. The method of any of clauses 19-21, further comprising using poly(N-(5-azidoacetamidylpentyl) acrylamide as the polymer.

23. The method of any of clauses 19-22, further comprising using a camphorquinone-amine photosensitizing system using a light wavelength of 470 nm as the light-sensitive photoinitiator system.

24. The method of any of clauses 19-23, further comprising using an alkyne-linked primer as the target reactant.

25. The method of any of clauses 19-23, further comprising using an alkyne-linked fluorophore as the target reactant.

26. The method of any of clauses 19-25, further comprising using a laser as a source of light.

27. The method of any of clauses 19-26, further comprising using a material having a refractive index in the range of 1.0 to 1.3 for the layer of light coupling gratings and a material having refractive index in the range of 2.0 to 2.15 for the core layer.

28. The method according to any of the preceding clauses 1-18 wherein silanizing is carried out by way of chemical vapor deposition of norbornene silane.

29. The method according to any of the preceding clauses 4-9, 13-18, wherein poly(N-(5-azidoacetamidylpentyl) acrylamide is spin coated on the silanized layer by way of the following procedure: Step 1—600 rpm, 5 seconds, acceleration 1500 rpm/second; Step 2—1500 rpm, 30 seconds, acceleration 5000 rpm/second; Step 3—4000 rpm, 5 seconds, acceleration 5000 rpm/second; Step 4—600 rpm, 5 seconds, acceleration 5000 rpm/second, and subsequently preferably heating at 65-75° C. for 1 hour.

30. The method according to any of the preceding clauses 21-27 wherein silanizing is carried out by vapor deposition of 3-azidopropyltrimethoxysilane, whereafter poly(N-(5-azidoacetamidylpentyl) acrylamide is preferably crosslinked to azide groups using a photo-initiated reaction that uses a bi-functional crosslinker such as NH-bis (PEG-2 Propargyl), a photo-initiator, (e.g., CQ, Ex. 470 nm), copper sulfate+ligand for example PMDTA.

31. The method according to any of the preceding clauses wherein the poly(N-(5-azidoacetamidylpentyl) acrylamide is covalently bound to surfaces at the bottom of the nanowells using the light, preferably laser light.

32. The method according to clauses 30 or 31 wherein the copper is subsequently removed using a dilute solution of EDTA (0.1M).

33. The method according to any of the preceding clauses, absent a polishing step to remove any existing surface chemistry found in interstitial areas between the nano wells.

34. The method according to any of the preceding clauses wherein light is directed through the light coupling gratings to only a bottom portion of each nanowell for photoinitiating the chemical reaction between the first and second groups of reactants.

35. A flow cell (10) for a photoinitiated chemical reaction, which flow cell comprises:
   a substrate (100),
   a light coupling grating layer (200) arranged on the substrate (100), which light coupling grating layer (200) has a refractive index,
   a core layer (300) arranged on the grating layer (200), which core layer (300) has a refractive index, wherein the refractive index of the core layer (300) is greater than the refractive index of the light coupling grating layer (200),
   a silanized layer (400) arranged on the core layer (300) in which silanized layer (400) multiple nanowells (500) are present, and
   wherein the nanowells (500) are separated by interstitial areas (600).

36. The flow cell (10) according to conclusion 35, wherein the substrate (100) is glass.

37. The flow cell according to clauses 35 or 36 wherein the light coupling grating layer (200) and the core layer (300) are formed from a resin.

38. The flow cell according to clause 37 wherein the light coupling grating layer (200) and/or the core layer (300) is formed from tantalum pentoxide.

39. The flow cell according to any of the clauses 35-38, wherein the silanized layer (400) is formed from a water buffer or a polymer cladding layer.

40. The flow cell according to any of the preceding clauses 35-39 wherein the refractive index of the light coupling grating layer (200) is in the range of 0.5 to 2.0; 0.8 to 1.5; or 1.0 to 1.3 and the refractive index of core layer (300) is in the range of 1.5 to 2.5; 1.8 to 2.3; or 2.0 to 2.15.

41. The flow cell according to any of the preceding clauses 35-40 wherein the poly(N-(5-azidoacetamidylpentyl) acrylamide is covalently bound to surfaces at the bottom of the nanowells (500).

42. The flow cell according to clause 41 further comprising a first group of reactants arranged on the poly(N-(5-azidoacetamidylpentyl) acrylamide covalently bound to surfaces at the bottom of the nanowells (500).

43. The flow cell according to clause 42 wherein a second group of reactants is arranged on the first group of reactants, which second group of reactants comprises includes at least one target reactant, a copper chelated ligand, and a light sensitive photoinitiator system.

44. A method of sequencing nucleic acids, using a flow cell made by any of the previous clauses 1-34 and/or a flow cell according to any of the clauses 35-43.

45. A system for photoinitiated chemical reactions comprising a flow cell according to any of the preceding clauses 35-43 and a light source, preferably a laser light source.

Additional features and aspects of the present invention will become apparent to those of ordinary skill in the art upon reading and understanding the following detailed description of the examples. As will be appreciated by the skilled artisan, further examples of the invention are possible without departing from the scope and spirit of the invention. Accordingly, the drawings and associated descriptions are to be regarded as illustrative and not restrictive in nature.

BRIEF DESCRIPTION OF THE DRAWINGS

The details of one or more implementations are set forth in the accompanying drawings and the description below. Other features, aspects, and advantages will become apparent from the description, the drawings, and the claims, in which:

DETAILED DESCRIPTION

Figure 1A:
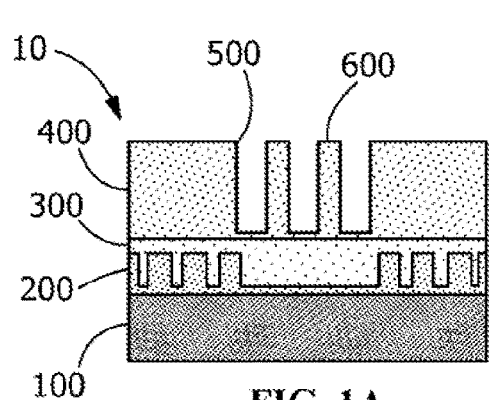
FIG. 1A depicts the structure of a planar waveguide flow cell in accordance with one implementation of the disclosed system and method.
Figure 1B:
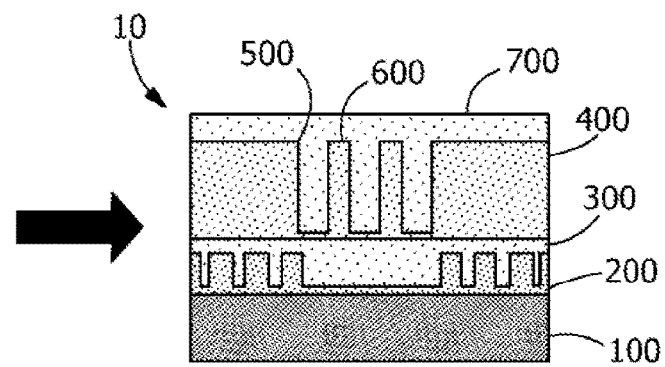
FIG. 1B depicts, in one implementation, the flow cell of FIG. 1A, wherein the upper surface of the flow cell has been hydrogel coated with azide moieties using poly(N-(5-azidoacetamidylpentyl) acrylamide-co-acrylamide) (PAZAM)
Figure 1C:
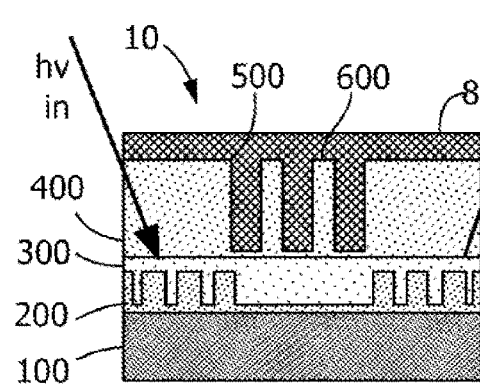
FIG. 1C depicts, in one implementation, the flow cell of FIG. 1B, wherein reactants have been introduced into the flow cell, wherein the reactants include alkyne-linked primers, a copper chelated ligand, and a light sensitive photoinitiator system.
Figure 1D:
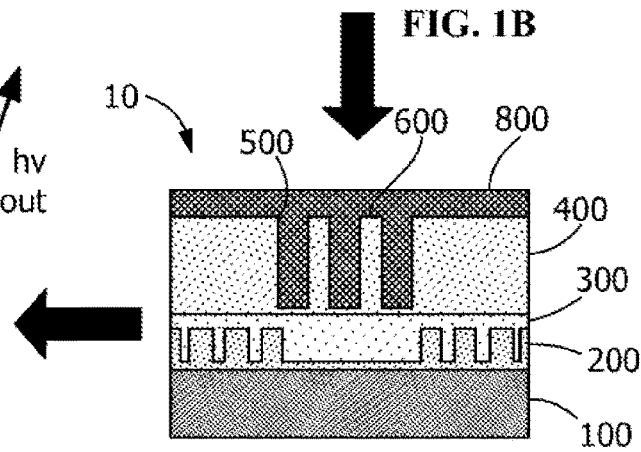
FIG. 1D depicts, in one implementation, the flow cell of FIG. 1C, wherein a planar waveguide has been coupled to the flow cell and is directing light into the flow cell.

Implementations of the disclosed system and method utilize planar waveguides to spatially control the chemical functionalization of nanowells used in microfluidic devices such as flow cells used for sequencing-by-synthesis. A planar waveguide (i.e., a waveguide having a planar geometry, which guides light in only one direction) directs excitation light into only the bottom region of the nanowells where the excitation light photoinitiates a chemical reaction that covalently binds target reactants to the bottom of the nanowells. Unreacted molecules are removed during a wash process, thereby localizing the target chemistry to the bottom of the nanowells.

Implementations of the disclosed system and method may include a photoinitiated azide-alkyne click reaction, such as that used in sequencing-by-synthesis technologies. In this type of reaction, azide functional groups are bound to a hydrogel layer formed across the surface of a microfluidic channel and alkyne-primer reactants are then added. The azide-alkyne click reaction is photo-initiated using, in certain examples, a copper compound and a photoinitiator system such as a Type II photoinitiator system, e.g., camphorquinone. This photoinitiator system can use blue light at about 470 nm as the excitation source. Mixed chemistries can be realized by adding alternate functional groups into the hydrogel layer by incorporating them into PAZAM. For example, azides and tetrazoles can be incorporated into PAZAM. The azide-alkyne click reaction is photoinitiated with light having a wavelength between 450 nm and 495 nm (e.g., blue) and the tetrazole-alkene reaction is photoinitiated with light having a different wavelength between 520 nm and 560 nm (e.g., green). In one example, the blue light employed has a wavelength of about 470 nm.

In general, click reactions (click chemistry) involve biocompatible small molecule reactions commonly used in bioconjugation for joining various substrates with specific biomolecules. The term "click chemistry" does not refer to a single specific reaction, but rather refers to chemical methods for generating substances by joining small modular units to one another. In many applications, click reactions are used to join a biomolecule and a reporter molecule. Click chemistry is not limited to biological applications and the concept of a click reaction has been used in pharmacological applications. The azide-alkyne click reaction involves the copper-catalyzed reaction of an azide with and alkyne to form a 5-membered heteroatom ring: a Cu(I)-catalyzed azide-alkyne cycloaddition (CuAAC). Photoinitiated reactions of this nature are described in Chen et al., *Photoinitiated Alkyne-Azide Click and Radical Cross-Linking Reactions for the Patterning of PEG Hydrogels*, BioMacromolecules, 2012, 13: 889-895; Shete and Kloxin, *One-pot blue light triggered tough interpenetrating polymeric network (IPN) using CuAAC and methacrylate reactions*, Polym. Chem., 2017, 8(24): 3668-3673; and Shete et al., *Blue-light activated rapid polymerization for defect-free bulk Cu(i)-catalyzed azide-alkene cycloaddition (CuAAC) crosslinked networks*, Chem. Commun (Camb)., 2016, 52(69): 10574-10577.

Figure 1E:
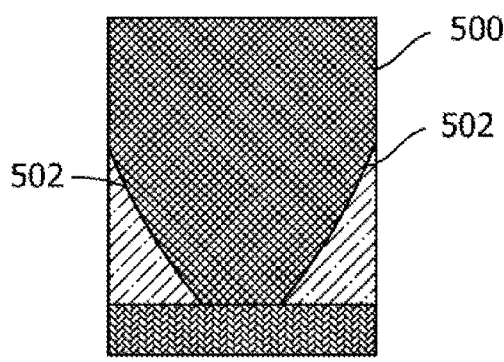
FIG. 1E depicts, in one implementation, a close-up view of a nanowell within the flow cell showing the areas of the nanowell onto which primers have been covalently bound.

With reference to FIGS. 1A-1E, the illustrations show fabrication of a flow cell including a planar waveguide. An example planar waveguide flow cell 10 includes substrate 100, which may be glass; light coupling grating layer 200, which may be a resin; core layer 300, which may be a resin having a refractive index higher than the resin used for light coupling grating layer 200 (e.g., tantalum pentoxide); and water buffer or patterned polymer cladding layer 400 (see FIG. 1A) in which multiple nanowells 500 are formed. Next, the upper surface of cladding layer 400 is coated with a hydrogel (e.g., PAZAM) to which azide moieties 700 have been bound (see FIG. 1B). Next, various reactants 800 are introduced into flow cell 10, wherein the reactants include alkyne-linked primers, a copper chelated ligand, a light sensitive photoinitiator system (see FIG. 1C). Next, light is directed into planar waveguide flow cell 10 using a light-focusing optic such that light coupling gratings 200 and core layer 300 reflect the light internally within flow cell 10. Evanescence waves penetrate the bottom of each nanowell 500 to initiate the desired chemical reaction. Sequencing primers or other molecules are covalently bound only to the bottom region of each nanowell 500 and are spatially excluded from interstitial areas 600. A washing step subsequently removes unreacted constituents such as any unbound hydrogel or unbound primers from the nanowells. Suitable washing solutions include alkaline buffers having a pH of at least 10 and sodium hydroxide. FIG. 1E provides a close-up of a nanowell 500 and areas 502 of FIG. 1E indicate the location of the covalently bound sequencing primers (or other molecules) after the photoinitiated reaction is complete.

In various implementations, the refractive index of the material of light coupling grating layer 200 is in the range of 0.5 to 2.0; 0.8 to 1.5; or 1.0 to 1.3 and the refractive index of the material of core layer 300 is in the range of 1.5 to 2.5; 1.8 to 2.3; or 2.0 to 2.15. Increasing the contrast difference between the refractive index values of light coupling grating layer 200 and core layer 300 may improve coupling efficiency of light into planar waveguide flow cell 10 provided that the refractive index of the upper layer (i.e., core layer 300) remains greater than the refractive index of the lower layer (i.e., light coupling grating layer 200). In one implementation, core layer 300 includes or is made from a metal oxide such as, for example, tantalum pentoxide ($Ta_2O_5$).

The following commercially available materials may be used in implementations of the disclosed method; (i) norbornene silane: [(5-bicyclo[2.2.1]HEPT-2-ENYL)ETHYL] TRIMETHOXYSILANE, tech-95, endo/exo isomers (Gelest Inc.); (ii) PAZAM: poly(N-(5-azidoacetamidylpentyl) acrylamide-co-acrylamide) of any acrylamide to Azapa ratio; (iii) Azapa: N-(5-azidoacetamidylpentyl) acrylamide; (iv) copper(II) sulfate pentahydrate ($CuSO_4 \cdot 5H_2O$) (Sigma-Aldrich); (v) N,N,N',N'',N''-Pentamethyldiethylenetriamine (PMDTA), (Sigma-Aldrich); (vi) Alexa Fluor® 488 alkyne (AF-488 alkyne) (Invitrogen); (vii) camphorquinone (CQ) photoinitiator (Sigma-Aldrich); (viii) ethylenediaminetetraacetic acid (EDTA) (Sigma-Aldrich); (ix) NH-bis(PEG-2 Propargyl), (BroadPharm), BP-2313; (x) 3-Azidopropyltrimethoxysilane (Gelest Inc.).

Scheme I: One-Step Photo-Initiated Click Reaction

Figure 2A:
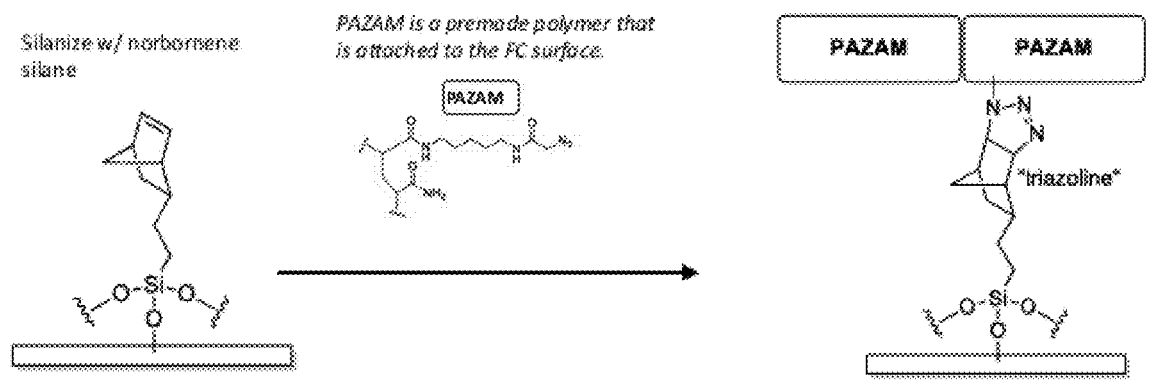
FIG. 2A depicts a chemical reaction wherein a PAZAM-azide polymer is attached to the surface of a planar waveguide flow cell in one implementation of the disclosed method.
Figure 2B:
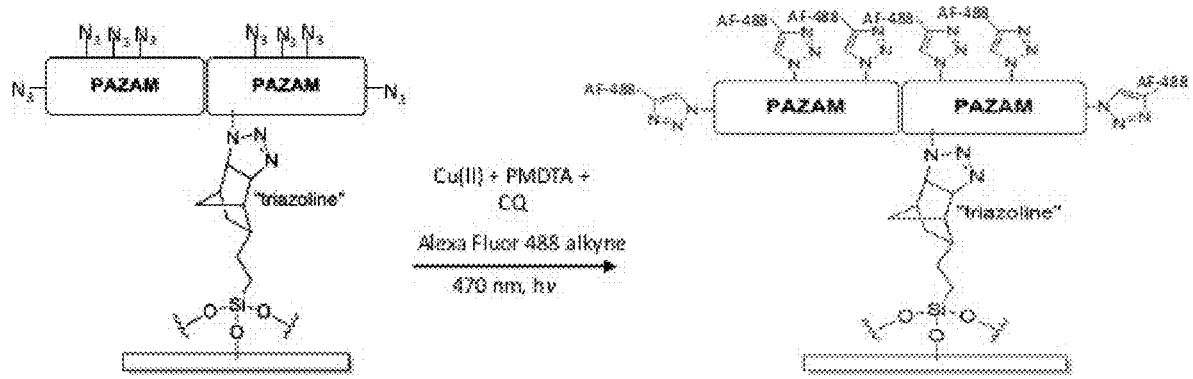
FIG. 2B depicts a chemical reaction wherein a photoinitiated alkyne-azide click reaction is used to covalently bind a target reactant to a nanowell substrate in one implementation of the disclosed method.

With reference to FIGS. 2A-2B, one implementation of the disclosed method utilizes a photoinitiation mechanism for the azide-alkyne click reaction that includes a camphorquinone-amine photosensitizing system using about 470 nm light. A planar waveguide flow cell is fabricated as described above and cladding layer 400 is further processed by utilizing the PAZAM polymer, to which azide moieties have been bound. As shown in FIG. 2A, the upper surface of cladding layer 400 is first silanized with a norbornene silane derivative using a chemical vapor deposition process; the process may be one that is standard in the industry. The surface is coated and then thermally cross-linked with PAZAM. This may be accomplished according to the following method (described in U.S. Patent App. Pub. No. 2015/0005447 A1): 500 µL of aqueous PAZAM (0.25%+5% ethanol) is deposited on top of a norbornene silanized glass substrate and spread across the surface. A thin film of PAZAM is obtained by spin coating with the following procedure: Step 1—600 rpm, 5 seconds, acceleration 1500 rpm/second; Step 2—1500 rpm, 30 seconds, acceleration 5000 rpm/second; Step 3—4000 rpm, 5 seconds, acceleration 5000 rpm/second; Step 4—600 rpm, 5 seconds, acceleration 5000 rpm/second. After spin-coating, substrates are heated at 65-75° C. in oven or hot plate for 1 hour.

As shown in FIG. 2B, a polymer solution containing Alexa Fluor® 488 (AF-488 alkyne) (30% w/w) with potassium carbonate (35 mM) and equal concentrations of $CuSO_4 \cdot 5H_2O$, (PMDTA) and the photo-initiator camphorquinone is prepared (note: a variant of this solution includes sequencing primers rather than AF-488 alkyne). The solution may be sonicated to facilitate dissolution. The solution is then introduced into the channels of the flow cell and held there for subsequent photo-initiation of the click reaction using the excitation laser optics of the planar waveguide. After the photo-initiated click reaction is complete, the copper is washed away from the flow cell channels using a solution of EDTA (0.1M), which forms a complex with the copper. Fluorescence images may be collected using a confocal fluorescence microscope to verify the presence of the fluorophore within the nanowells of the flow cell. As previously indicated, the reaction occurs only in the bottom region of the nanowells because light is directed only into the nanowells by way of the planar waveguide grating. No polishing was used because dye-labeled molecules are bound only in the nanowells and not in interstitial spaces or regions between nanowells.

Scheme II: Two-Step Photo-Initiated Click Reaction

Figure 3A:
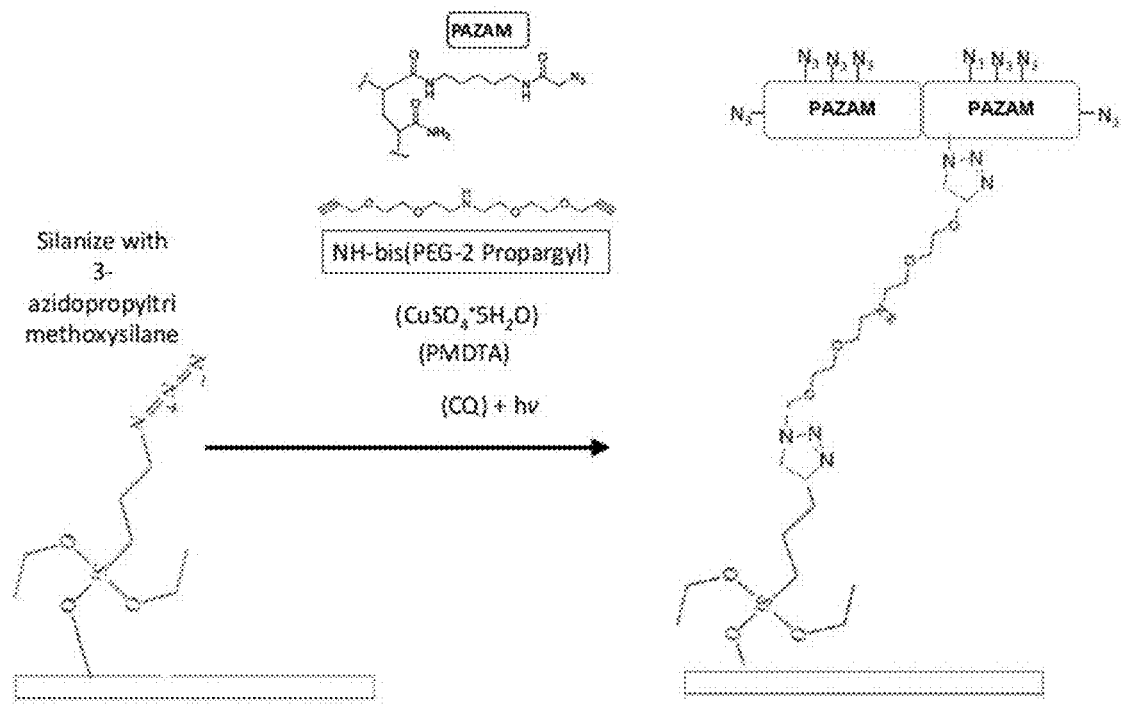
FIG. 3A depicts a chemical reaction wherein a PAZAM-azide polymer coated onto the surface of a planar waveguide flow cell is patterned with a first photo-initiated click reaction in another implementation of the disclosed method.
Figure 3B:
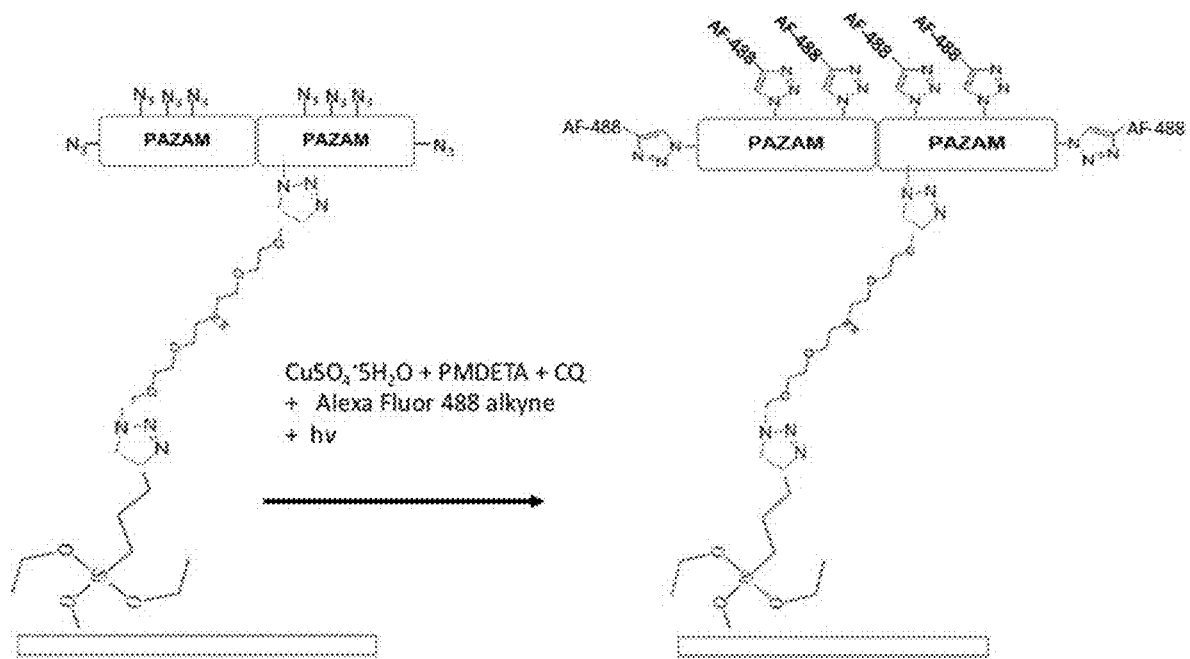
FIG. 3B depicts a chemical reaction wherein primers (fluorophores) are patterned onto the PAZAM layer of FIG. 3A using a second photo-initiated click reaction.

With reference to FIGS. 3A-3B, another implementation of the disclosed method provides a two-step photo-initiated click reaction that also uses a camphorquinone-amine photosensitizing system using about 470 nm light. This two-step process minimizes diffusion of reagents away from desired target regions, thereby leading to less functionalization of interstitial spaces or regions between flow cell nanowells. A planar waveguide is fabricated as described above, and in a first step of this implementation (see FIG. 3A), PAZAM is photo-patterned in the nanowells using a first photo-initiated click reaction. This first step includes attaching azide groups to the surface of the flow cell using 3-azidopropyltrimethoxysilane with chemical vapor deposition process; the process may be one that is standard in the industry. PAZAM is then crosslinked to azide groups using a photo-initiated reaction that uses a bi-functional crosslinker such as NH-bis (PEG-2 Propargyl), a photo-initiator, (e.g., CQ, Ex. 470 nm), and copper sulfate with a ligand (e.g., PMDTA), and light. PAZAM is covalently bound to surfaces at the bottom of the nanowells using laser light directed into the planar wave guide. After the reaction is complete, the copper is removed using a dilute solution of EDTA (0.1M), which forms a complex with the copper.

In a second step (see FIG. 3B), a fluorescent tag (or another molecule) is patterned using a second photo-initiated click reaction. A polymer solution containing Alexa Fluor® 488 (AF-488 alkyne) (30% w/w) with potassium carbonate (35 mM) and equal concentrations of $CuSO_4 \cdot 5H_2O$, PMDTA, and the photo-initiator camphorquinone is prepared. The solution may be sonicated to facilitate dissolution. The solution is then introduced into the channels of the flow cell and held there for subsequent photo-initiation using the excitation laser optics of the planar waveguide. After the photo-initiated click reaction is complete, the copper is washed away from the channels using a solution of EDTA (0.1M), which forms a complex with the copper. Fluorescence images are collected using a confocal fluorescence microscope to verify the presence of the fluorophore within the nanowells of the flow cell. As previously indicated, the reaction occurs only at the bottom of the nanowells because light is directed only into the nanowell by way of the planar waveguide grating. No polishing is necessary because Alexa-labeled dye molecules are bound only in the nanowells and not in interstitial spaces or regions between nanowells.

Figure 4:
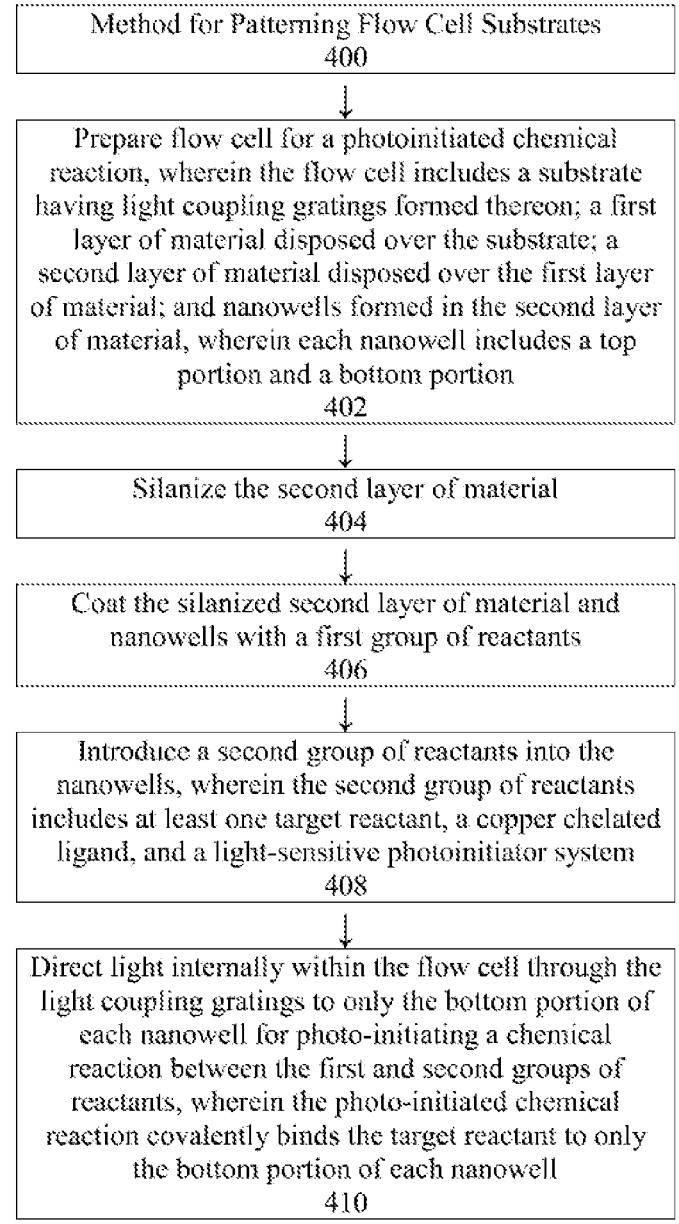
FIG. 4 is a flowchart depicting an implementation of a first method for patterning flow cell substrates.

FIG. 4 is a flowchart depicting an implementation of a first method for patterning flow cell substrates. First method for patterning flow cell substrates 400 comprises preparing a flow cell for a photoinitiated chemical reaction at block 402, wherein the flow cell includes a substrate having light coupling gratings formed thereon; a first layer of material disposed over the substrate; a second layer of material disposed over the first layer of material; and nanowells formed in the second layer of material, wherein each nanowell includes a top portion and a bottom portion, and wherein preparing the flow cell includes silanizing the second layer of material at block 404; and coating the silanized second layer of material and nanowells with a first group of reactants at block 406; introducing a second group of reactants into the nanowells at block 408, wherein the second group of reactants includes at least one target reactant, a copper chelated ligand, and a light-sensitive photoinitiator system; and directing light internally within the flow cell through the light coupling gratings to only the bottom portion of each nanowell for photo-initiating a chemical reaction between the first and second groups of reactants at block 410, wherein the photo-initiated chemical reaction covalently binds the target reactant to only the bottom portion of each nanowell.

Regarding the implementation depicted in FIG. 4, the following are non-limiting examples of various aspects of the described method. Example photoinitiated chemical reactions include azide-alkyne chemical reactions using blue light of a predetermined wavelength between about 450 nm and 495 nm; tetrazole-alkene chemical reactions using green light of a predetermined wavelength between about 520 nm and 560 nm; and metal free azide/acetylene cycloaddition reactions utilizing triple bond masking with dibenzocyclooctynes as cyclopropenone (see, for example, JACS 2009, 131, 15769-15776). Example techniques for forming light coupling gratings on the substrate (which may be glass) include photolithographic patterning of a silicon dioxide ($SiO_2$) grating, lift-off processes, laser etching, and nanoimprinting. Example materials for the first layer of material include low refractive index nanoimprint lithography (NIL) resins and low refractive index polymers. Example techniques for depositing the first layer of material on the substrate include sputter coating and spin coating. Example materials for the second layer of material include high refractive index resins, high refractive index polymers, and metal oxides such as, for example, tantalum pentoxide ($Ta_2O_5$). Example techniques for depositing the second layer of material on the first layer of material include vacuum thin film vapor deposition, sputter coating and spin coating. Example techniques for forming the nanowells in the second layer of material include nanoimprinting lithographic patterning. Example techniques for coating the silanized second layer of material and nanowells with a first group of reactants include sputter coating and spin coating. Example techniques for introducing a second group of reactants into the nanowells include using a microfluidic pump system such as, for example, a peristaltic pump. Example techniques for directing light internally within the flow cell through the light coupling gratings include using a focusing optic to direct light from an external source into the flow cell.

Figure 5:
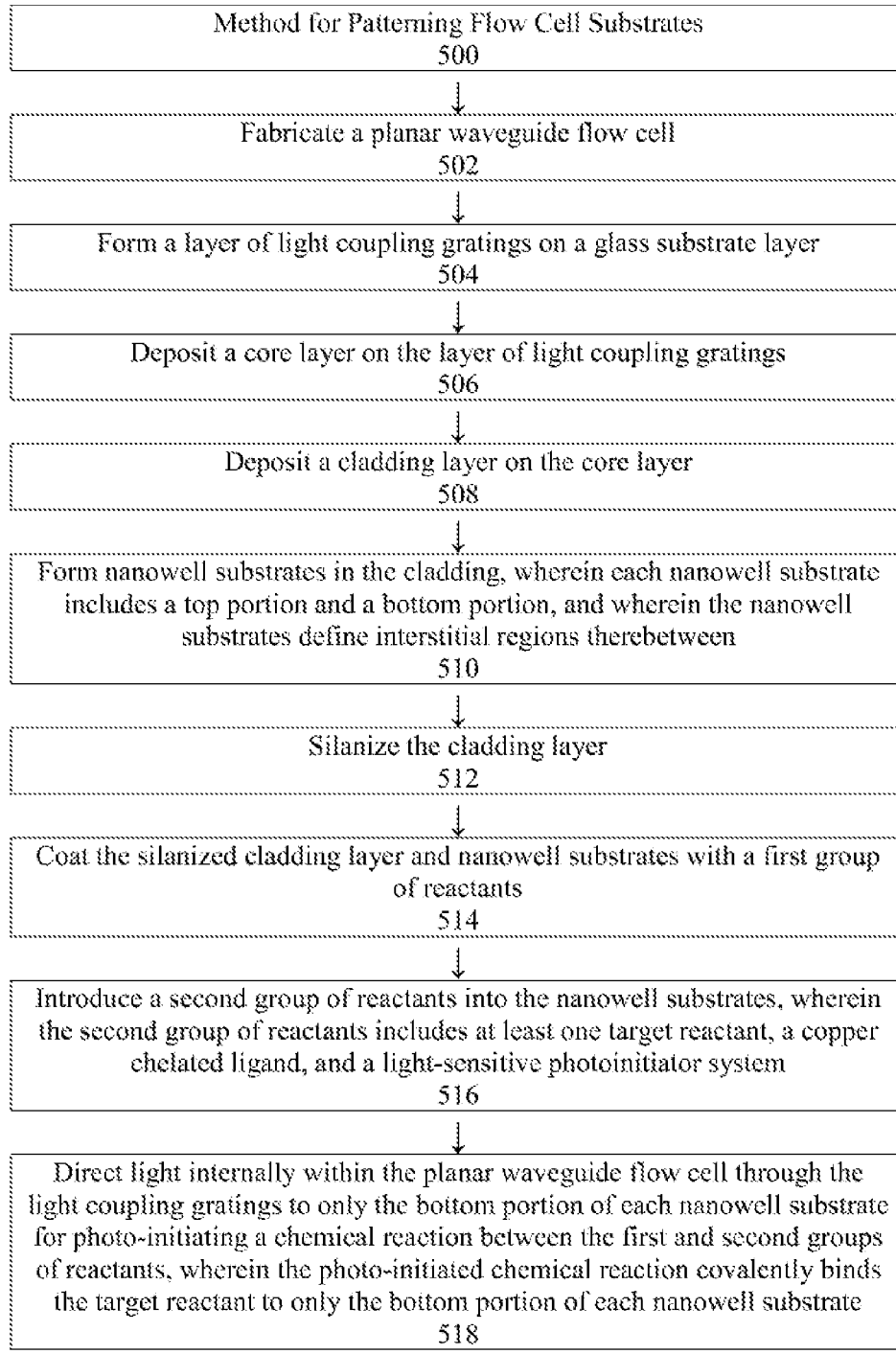
FIG. 5 is a flowchart depicting an implementation of a second method for patterning flow cell substrates.

FIG. 5 is a flowchart depicting an implementation of a second method for patterning flow cell substrates. Second method for patterning flow cell substrates 500 comprises fabricating a planar waveguide flow cell at block 502 by forming a layer of light coupling gratings on a glass substrate layer at block 504; depositing a core layer on the layer of light coupling gratings at block 506; depositing a cladding layer on the core layer at block 508; and forming nanowell substrates in the cladding layer at block 510, wherein each nanowell substrate includes a top portion and a bottom portion, and wherein the nanowell substrates define interstitial regions therebetween; silanizing the cladding layer at block 512; coating the silanized cladding layer and nanowell substrates with a first group of reactants at block 514; introducing a second group of reactants into the nanowell substrates at block 516, wherein the second group of reactants includes at least one target reactant, a copper chelated ligand, and a light-sensitive photoinitiator system; and directing light internally within the planar waveguide flow cell through the light coupling gratings to only the bottom portion of each nanowell substrate for photo-initiating a chemical reaction between the first and second groups of reactants at block 518, wherein the photo-initiated chemical reaction covalently binds the target reactant to only the bottom portion of each nanowell substrate.

Regarding the implementation depicted in FIG. 5, the following are non-limiting examples of various aspects of the described method. Example techniques for forming a layer of light coupling gratings on the substrate (which may be glass) include photolithographic patterning of a silicon dioxide ($SiO_2$) grating, lift-off processes, laser etching, and nanoimprinting. Example materials for the core layer include low refractive index nanoimprint lithography (NIL) resins and low refractive index polymers. Example techniques for depositing the core layer on the substrate include sputter coating and spin coating. Example materials for the cladding layer include high refractive index resins, high refractive index polymers, and metal oxides such as, for example, tantalum pentoxide ($Ta_2O_5$). Example techniques for depositing the cladding layer on the core layer include vacuum thin film vapor deposition, sputter coating and spin coating. Example techniques for forming the nanowells in the second layer of material include nanoimprinting lithographic patterning. Example techniques for coating the silanized cladding layer and nanowells with a first group of reactants include sputter coating and spin coating. Example techniques for introducing a second group of reactants into the nanowells include using a microfluidic pump system such as, for example, a peristaltic pump. Example techniques for directing light internally within the flow cell through the light coupling gratings include using a focusing optic to direct light from an external source into the flow cell. Example photoinitiated chemical reactions include azide-alkyne chemical reactions using blue light of a predetermined wavelength between about 450 nm and 495 nm; tetrazole-alkene chemical reactions using green light of a predetermined wavelength between about 520 nm and 560 nm; and metal free azide/acetylene cycloaddition reactions utilizing triple bond masking with dibenzocyclooctynes as cyclopropenone (see, for example, JACS 2009, 131, 15769-15776).

Figure 6:
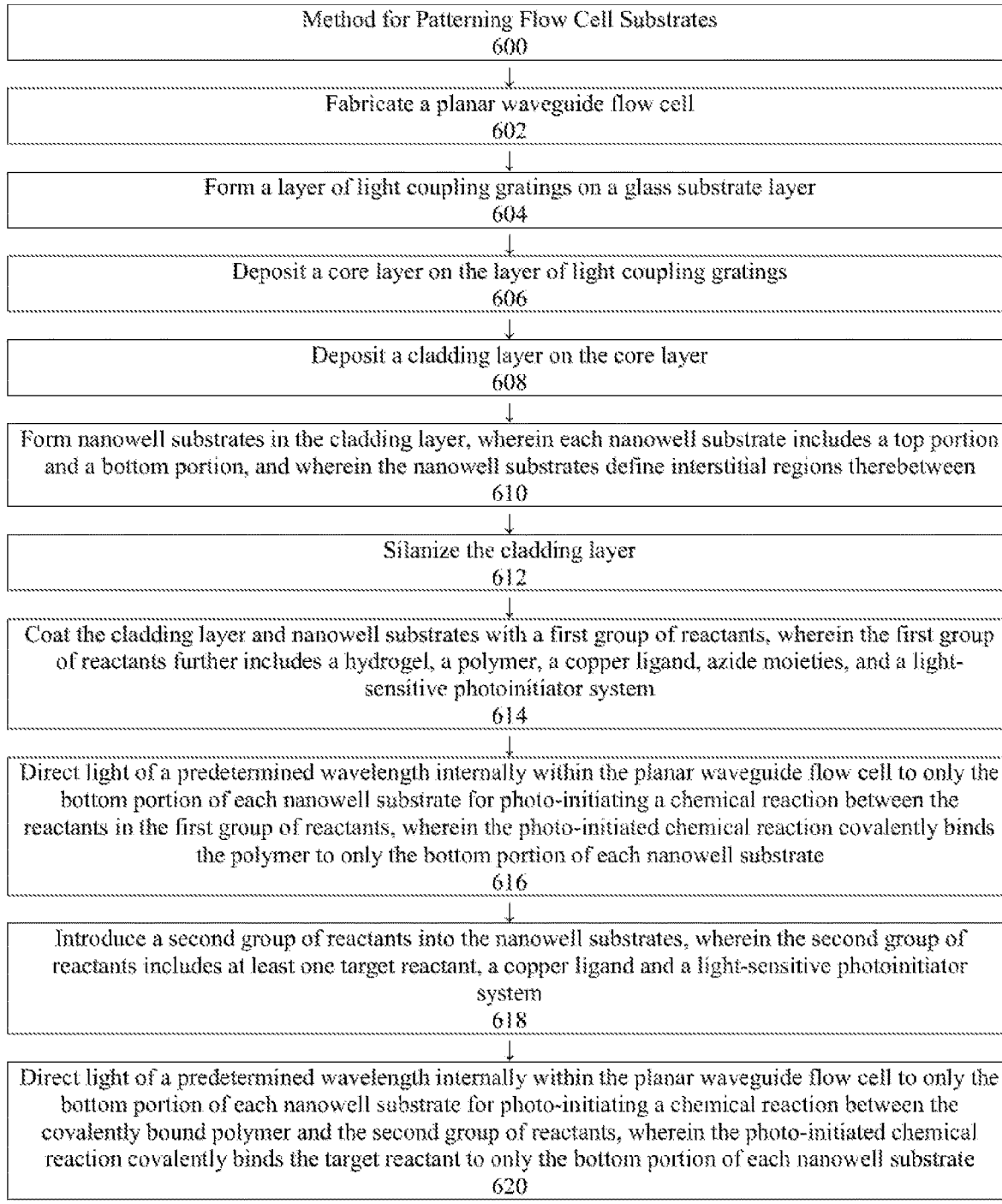
FIG. 6 is a flowchart depicting an implementation of a third method for patterning flow cell substrates.

FIG. 6 is a flowchart depicting an implementation of a third method for patterning flow cell substrates. Third method for patterning flow cell substrates 600 comprises fabricating a planar waveguide flow cell at block 602 by forming a layer of light coupling gratings on a glass substrate layer at block 604; depositing a core layer on the layer of light coupling gratings at block 606; depositing a cladding layer on the core layer at block 608; and forming nanowell substrates in the cladding layer at block 610, wherein each nanowell substrate includes a top portion and a bottom portion, and wherein the nanowell substrates define interstitial regions therebetween; and silanizing the cladding layer at block 612; coating the cladding layer and nanowell substrates with a first group of reactants at block 614, wherein the first group of reactants further includes, a polymer, azide moieties bound to the polymer, a copper ligand, and a light-sensitive photoinitiator system; directing light of a predetermined wavelength internally within the planar waveguide flow cell to only the bottom portion of each nanowell substrate for photo-initiating a chemical reaction between the reactants in the first group of reactants at block 616, wherein the photo-initiated chemical reaction covalently binds the polymer to only the bottom portion of each nanowell substrate; introducing a second group of reactants into the nanowell substrates at block 618, wherein the second group of reactants includes at least one target reactant, a copper ligand and a light-sensitive photoinitiator system; and directing light of a predetermined wavelength internally within the planar waveguide flow cell to only the bottom portion of each nanowell substrate for photo-initiating a chemical reaction between the covalently bound polymer and the second group of reactants at block 620, wherein the photo-initiated chemical reaction covalently binds the target reactant to only the bottom portion of each nanowell substrate.

Regarding the implementation depicted in FIG. 6, the following are non-limiting examples of various aspects of the described method. Example techniques for forming light coupling gratings on the substrate (which may be glass) include photolithographic patterning of a silicon dioxide ($SiO_2$) grating, lift-off processes, laser etching, and nanoimprinting. Example materials for the core layer include low refractive index nanoimprint lithography (NIL) resins and low refractive index polymers. Example techniques for depositing the core layer on the substrate include sputter coating and spin coating. Example materials for the cladding layer include high refractive index resins, high refractive index polymers, and metal oxides such as, for example, tantalum pentoxide ($Ta_2O_5$). Example techniques for depositing the cladding layer on the core layer include vacuum thin film vapor deposition, sputter coating and spin coating. Example techniques for forming the nanowells in the second layer of material include nanoimprinting lithographic patterning. Example techniques for coating the silanized cladding layer and nanowells with a first group of reactants include sputter coating and spin coating. Example techniques for introducing a second group of reactants into the nanowells include using a microfluidic pump system such as, for example, a peristaltic pump. Example techniques for directing light internally within the flow cell through the light coupling gratings include using a focusing optic to direct light from an external source into the flow cell. Example photoinitiated chemical reactions include azide-alkyne chemical reactions using blue light of a predetermined wavelength between about 450 nm and 495 nm; tetrazole-alkene chemical reactions using green light of a predetermined wavelength between about 520 nm and 560 nm; and metal free azide/acetylene cycloaddition reactions utilizing triple bond masking with dibenzocyclooctyynes as cyclopropenone (see, for example, JACS 2009, 131, 15769-15776).

All literature and similar material cited in this application, including, but not limited to, patents, patent applications, articles, books, treatises, and web pages, regardless of the format of such literature and similar materials, are expressly incorporated by reference in their entirety. In the event that one or more of the incorporated literature and similar materials differs from or contradicts this application, including but not limited to defined terms, term usage, described techniques, or the like, this application controls.

The foregoing description is provided to enable a person skilled in the art to practice the various configurations described herein. While the subject technology has been particularly described with reference to the various figures and configurations, it should be understood that these are for illustration purposes only and should not be taken as limiting the scope of the subject technology.

As used herein, an element or step recited in the singular and preceded with the word "a" or "an" should be understood as not excluding plural of said elements or steps, unless such exclusion is explicitly stated. Furthermore, references to "one implementation" are not intended to be interpreted as excluding the existence of additional implementations that also incorporate the recited features. Moreover, unless explicitly stated to the contrary, implementations "comprising" or "having" an element or a plurality of elements having a particular property may include additional elements whether or not they have that property.

The terms "substantially" and "about" used throughout this Specification are used to describe and account for small fluctuations, such as due to variations in processing. For example, they can refer to less than or equal to ±5%, such as less than or equal to ±2%, such as less than or equal to ±1%, such as less than or equal to ±0.5%, such as less than or equal to ±0.2%, such as less than or equal to ±0.1%, such as less than or equal to ±0.05%.

There may be many other ways to implement the subject technology. Various functions and elements described herein may be partitioned differently from those shown without departing from the scope of the subject technology. Various modifications to these implementations may be readily apparent to those skilled in the art, and generic principles defined herein may be applied to other implementations. Thus, many changes and modifications may be made to the subject technology, by one having ordinary skill in the art, without departing from the scope of the subject technology. For instance, different numbers of a given module or unit may be employed, a different type or types of a given module or unit may be employed, a given module or unit may be added, or a given module or unit may be omitted.

Underlined and/or italicized headings and subheadings are used for convenience only, do not limit the subject technology, and are not referred to in connection with the interpretation of the description of the subject technology.

All structural and functional equivalents to the elements of the various implementations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

The invention claimed is:

1. A method for patterning flow cell substrates, comprising:
preparing a planar waveguide flow cell for a photoinitiated chemical reaction, wherein the flow cell includes:
a substrate;
light coupling gratings on the substrate;
a first layer of material disposed over the substrate and the light coupling gratings;
a patterned second layer of material disposed over the first layer of material, the patterned second layer of material defining nanowells formed in the second layer of material, wherein each nanowell includes a top portion and a bottom portion, and the patterned second layer of material further defines interstitial regions between the nanowells,
wherein preparing the flow cell includes:
silanizing the second layer of material such that both the nanowells and the interstitial regions are silanized;
coating the silanized second layer of material and nanowells with a first group of reactants such that both the nanowells and the interstitial regions are coated with the first group of reactants;
introducing a second group of reactants into the nanowells, wherein the second group of reactants includes at least one target reactant, a copper chelated ligand, and a light-sensitive photoinitiator system; and
directing light internally within the flow cell such that the light coupling gratings and the first layer of material reflect the light to only the bottom portion of each nanowell for photo-initiating a chemical reaction between the first and second groups of reactants, wherein the photo-initiated chemical reaction covalently binds the at least one target reactant to only the bottom portion of each nanowell and the at least one target reactant is not bound to the interstitial regions.

2. The method of claim 1, further comprising washing unreacted reactants out of the nanowells.

3. The method of claim 2, further comprising using a polymer and azide moieties that are bound to the polymer as the first group of reactants.

4. The method of claim 3, further comprising using poly(N-(5-azidoacetamidylpentyl) acrylamide as the polymer.

5. The method of claim 4, further comprising using a camphorquinone-amine photosensitizing system using a light wavelength of about 470 nm as the light-sensitive photoinitiator system.

6. The method of claim 5, further comprising using an alkyne-linked primer as the at least one target reactant.

7. The method of claim 6, further comprising using an alkyne-linked fluorophore as the at least one target reactant.

8. The method of claim 7, further comprising using a laser as a source of the light.

9. The method of claim 8, further comprising using a material having a refractive index in the range of 1.0 to 1.3 for the substrate and a material having a refractive index in the range of 2.0 to 2.15 for the first layer of material.

10. A method for patterning flow cell substrates, comprising:
fabricating a planar waveguide flow cell, wherein fabricating the planar waveguide flow cell includes:
forming light coupling gratings on a glass substrate;
depositing a core layer on the light coupling gratings;
depositing a cladding layer on the core layer; and
patterning the cladding layer to include nanowells in the cladding layer and interstitial regions of the cladding layer between the nanowells, wherein each nanowell includes a top portion and a bottom portion;
silanizing the patterned cladding layer of the planar waveguide flow cell such that both the nanowells and the interstitial regions are silanized;
coating the silanized cladding layer with a first group of reactants such that both the nanowells and the interstitial regions are coated with the first group of reactants;
introducing a second group of reactants into the nanowells, wherein the second group of reactants includes at least one target reactant, a copper chelated ligand, and a light-sensitive photoinitiator system; and
directing light internally within the planar waveguide flow cell such that the light coupling gratings and the core layer reflect the light to only the bottom portion of each nanowell for photo-initiating a chemical reaction between the first and second groups of reactants, wherein the photo-initiated chemical reaction covalently binds the at least one target reactant to only the bottom portion of each nanowell and the at least one target reactant is not bound to the interstitial regions.

11. The method of claim 10, further comprising washing unreacted reactants out of the nanowell substrates.

12. The method of claim 11, further comprising using a polymer and azide moieties that are bound to the polymer as the first group of reactants.

13. The method of claim 12, further comprising using poly (N-(5-azidoacetamidylpentyl) acrylamide as the polymer.

14. The method of claim 13, further comprising using a camphorquinone-amine photosensitizing system using a light wavelength of about 470 nm as the light-sensitive photoinitiator system.

15. The method of claim 14, further comprising using an alkyne-linked primer as the at least one target reactant.

16. The method of claim 15, further comprising using an alkyne-linked fluorophore as the at least one target reactant.

17. The method of claim 16, further comprising using a laser as a source of the light.

18. The method of claim 17, further comprising using a material having a refractive index in the range of 1.0 to 1.3 for the layer of light coupling gratings and a material having a refractive index in the range of 2.0 to 2.15 for the core layer.

19. A method for patterning flow cell substrates, comprising:
fabricating a planar waveguide flow cell, wherein fabricating the planar waveguide flow cell includes:
forming light coupling gratings on a glass substrate;
depositing a core layer on the light coupling gratings;
depositing a cladding layer on the core layer; and
patterning the cladding layer to include nanowells in the cladding layer and interstitial regions of the cladding layer between the nanowells, wherein each nanowell includes a top portion and a bottom portion;
silanizing the patterned cladding layer of the planar waveguide flow cell such that both the nanowells and the interstitial regions of the patterned cladding layer are silanized;
coating the silanized cladding layer with a first group of reactants such that both the nanowells and the interstitial regions of the cladding layer are coated with the first group of reactants, wherein the first group of reactants includes a polymer, azide moieties bound to the polymer, a copper ligand, and a first light-sensitive photoinitiator system;
directing first light of a predetermined wavelength internally within the planar waveguide flow cell such that the light coupling gratings and the core layer reflect the first light to only the bottom portion of each nanowell for photo-initiating a first chemical reaction between the reactants in the first group of reactants, wherein the photo-initiated first chemical reaction covalently binds the polymer to only the bottom portion of each nanowell and the polymer is not bound to the interstitial regions;
introducing a second group of reactants into the nanowells, wherein the second group of reactants includes at least one target reactant, a copper ligand, and a second light-sensitive photoinitiator system; and
directing second light of a predetermined wavelength internally within the planar waveguide flow cell such that the light coupling gratings and the core layer reflect the second light to only the bottom portion of each nanowell for photo-initiating a second chemical reaction between the covalently bound polymer and the second group of reactants, wherein the photo- initiated second chemical reaction covalently binds the at least one target reactant to only the bottom portion of each nanowell and the at least one target reactant is not bound to the interstitial regions.

20. The method of claim 19, further comprising washing unreacted reactants out of the nanowell substrates after each of the first and second photo-initiated chemical reactions.

* * * * *